Dec. 8, 1925.

E. NASTRI

AUTOMOBILE BUMPER

Filed Aug. 12, 1922

1,564,488

INVENTOR.
Emil Nastri
BY Abraham Aaron
ATTORNEY.

Patented Dec. 8, 1925.

1,564,488

UNITED STATES PATENT OFFICE.

EMIL NASTRI, OF BROOKLYN, NEW YORK.

AUTOMOBILE BUMPER.

Application filed August 12, 1922. Serial No. 581,372.

*To all whom it may concern:*

Be it known that I, EMIL NASTRI, a citizen of the United States, and a resident of the borough of Brooklyn, county of Kings, city and State of New York (whose post-office address is No. 292 Manhattan Avenue, Brooklyn, New York), have invented a new and useful Improvement in Automobile Bumpers, of which the following is such a full, clear, and exact description as will enable anyone skilled in the art to which it appertains to make and use the same, reference being had to the accompanying drawing, which forms part of this application.

The object of my invention is to provide a means for protecting the front and rear of an automobile from collision and accident in the form of an automobile bumper, which is attached to the chassis of the automobile.

By my method of construction, I provide a bumper which uses for its chief means of operation, a spring compression. My said invention is fully shown in the following specification of which the accompanying drawing forms a part wherein similar numerals of reference designate like or equivalent parts throughout the several views and in which—

Figure 2:
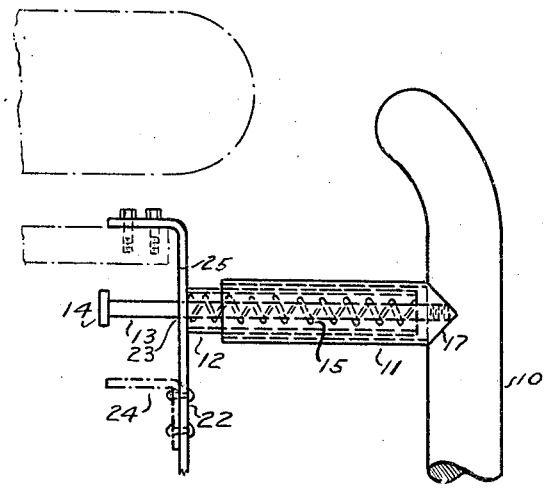
Figure 2 shows a view of the bumper compressed.

Referring more specifically to the drawing, No. 10 indicates the bumper rod; 11 indicates the outside tube; 12 indicates the inside tube with 13 the stop rods attached; 14 shows the head of the stop rod with 15 indicating the spring attached thereto. The stop bolt 16 is attached, and the tube 17 is fastened by welding or otherwise to the bumper rod 10, and the inner tube 12 is welded to the cross tie rod 22.

The bumper is further affixed as at 20 by bolts fastening the bumper to the frame 19, the holes in the cross tie rod 23 are the means for the bolts 13 holding the bumper in position on the chassis. The bumper is turned inwardly at 24.

It is evident that many changes and modifications in my new and improved form of bumper herein first disclosed may be made without departing from the broad scope of my invention, as it may be that I will not limit myself to the exact construction shown.

I claim:—

Figure 1:
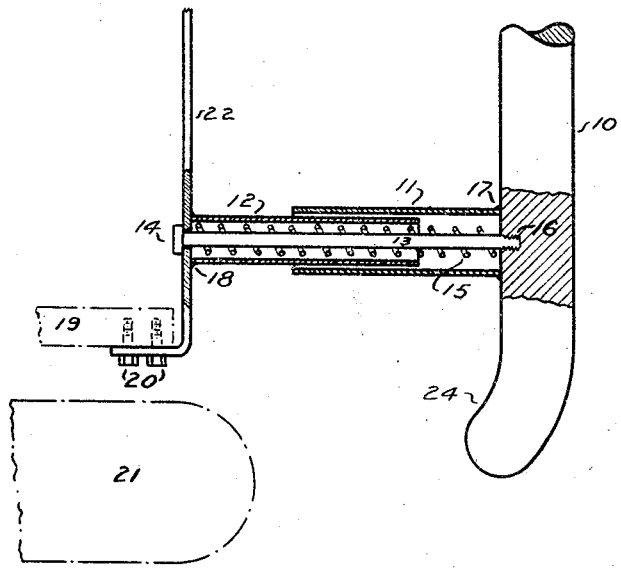
Figure 1 shows a section of the bumper in normal position.

An automobile bumper adapted to face to the front or rear, comprising a fender or bumper-rod extending from one longitudinal side of the vehicle to the other provided at either end with end portions bent toward the vehicle so as to slip easily by any obstruction met; a hollow annular tubular securing-member rigidly secured at its forward end, adjacent to either end of such fender or bumper-rod; a reversely faced hollow annular tubular securing member reciprocatingly located within each of the like hollow annular members secured to the bumper-rod, and reciprocating easily one within the other; a central stop-rod, rigidly secured at its forward end to the rear side or face of the bumper-rod and passing at its extreme rearward end through a small hole formed in and through a suitable stop-plate carried by the body of the vehicle, such stop-rod being provided at its extreme end where it passes through the stop-plate with an enlarged retaining-head 14, which is in abutment with the stop-plate, only when such stop-rod is in the extreme forward position shown in Figure 1; and a coil-spring member extending from the stop-plate to the adjacent abutting surface of the bumper-rod, surrounding the stop-rod and carried within the reversely open ended hollow annular tubular securing members.

EMIL NASTRI.